May 26, 1964   J. BERNATT   3,134,865
ROTATING BLADE SWITCH
Filed Dec. 27, 1960   3 Sheets-Sheet 1
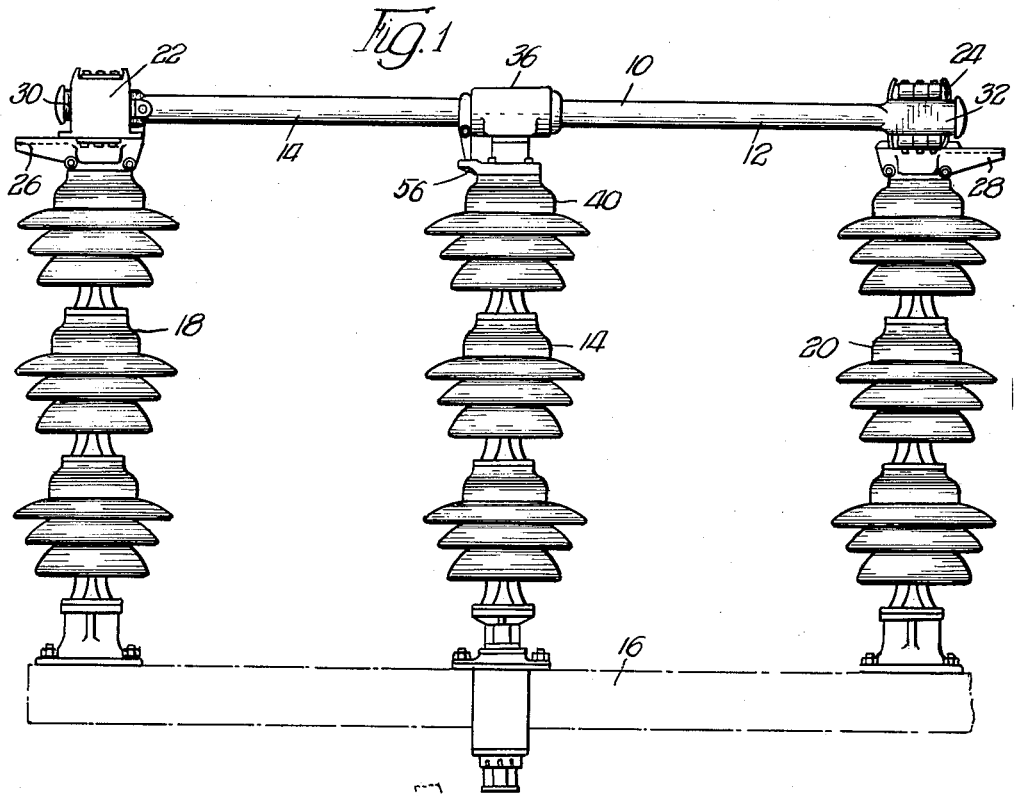
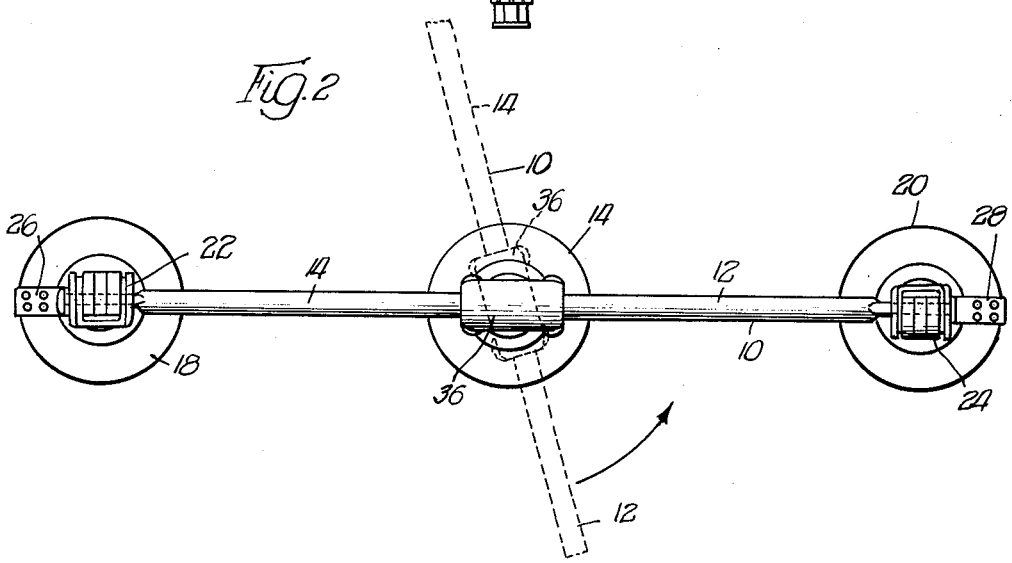
INVENTOR.
Joseph Bernatt,
BY
Byron, Hume, Groen & Clement
ATTYS

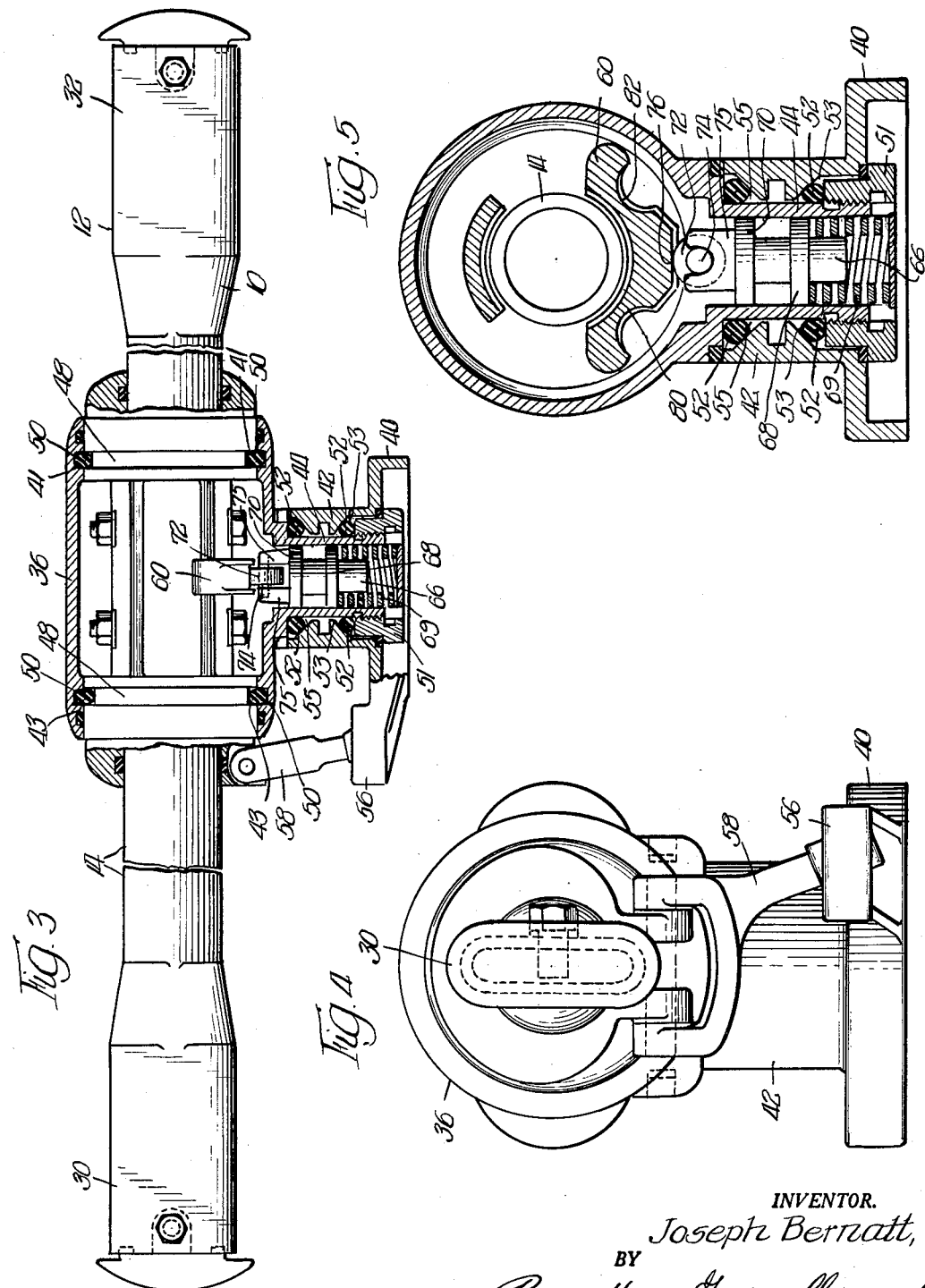

May 26, 1964  J. BERNATT  3,134,865
ROTATING BLADE SWITCH
Filed Dec. 27, 1960  3 Sheets-Sheet 3

INVENTOR.
Joseph Bernatt,
BY
Byron, Hume, Groen + Clement
Attys

3,134,865
ROTATING BLADE SWITCH

Joseph Bernatt, Elmhurst, Ill., assignor to James R. Kearney Corporation, St. Louis, Mo., a corporation of Delaware
Filed Dec. 27, 1960, Ser. No. 78,658
3 Claims. (Cl. 200—48)

This invention relates in general to an electrical switch and, in particular, to a rotating blade electrical switch capable of withstanding high currents and adapted for usage under adverse weather conditions.

It is an object of this invention to provide an improved rotating blade electrical switch of the type wherein the rotating blade is capable of rotation about two axes.

It is a further object of this invention to provide an improved rotating blade electrical switch of the type wherein the rotating blade is initially rotated into loose contact with a fixed switch contact and subsequently rotated about its own axis into a tight secured contact with the fixed switch contact.

It is another object of the invention to provide an improved rotating blade electrical switch of the type wherein the rotating blade is securely engaged by a fixed switch contact when the electrical switch is in a closed condition and wherein the rotating blade is first rotated about its own axis before the electrical switch can be placed in an open condition.

The invention, both as to its organization and method of operation will best be understood by reference to the following description taken in connection with the accompanying drawings, in which:

FIGURE 1 is a front elevational view illustrating a rotating blade electrical switch embodying the features of the invention;

FIGURE 2 is a diagrammatical plan view illustrating the embodiment of the invention illustrated in FIGURE 1;

FIGURE 3 is a fragmentary cross sectional view of the embodiment of the invention illustrated in FIGURE 1;

FIGURE 4 is a fragmentary diagrammatical side elevational view of the embodiment of the invention illustrated in FIGURE 1;

FIGURE 5 is a fragmentary side elevational cross sectional view of the embodiment of the invention illustrated in FIGURE 1;

Figure 6:
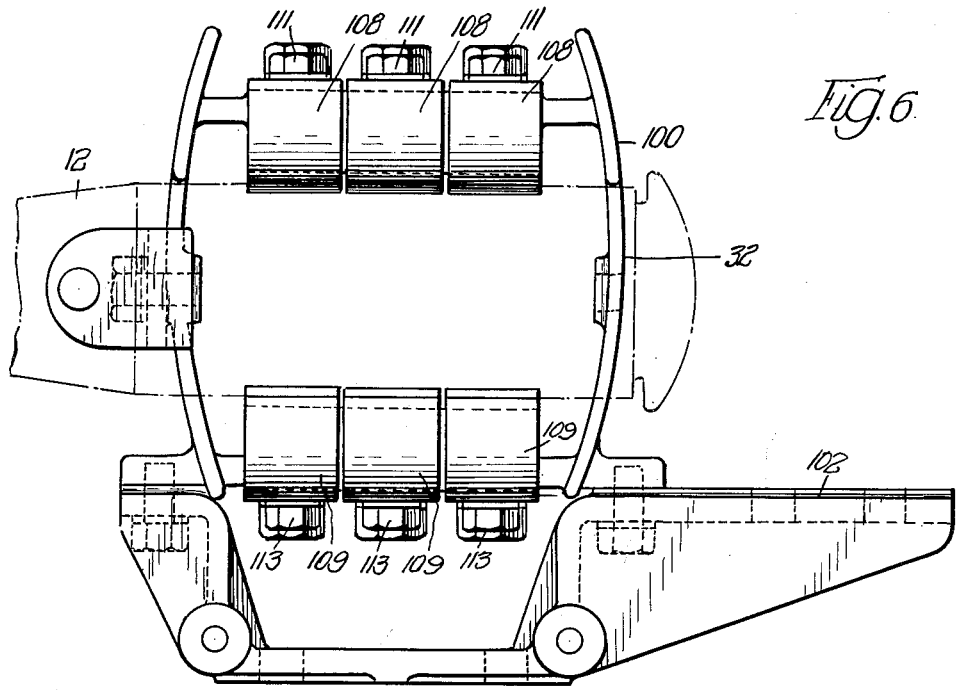
FIGURE 6 is a fragmentary front elevational view illustrating in more detail the fixed switch contact and rotating blade of the embodiment of the invention illustrated in FIGURE 1.

In the preferred embodiment of the invention illustrated in the drawings, a rotating blade double break electrical switch is provided with a pivotable center post upon which a rotating blade assembly is disposed. The rotating blade assembly is rotatable in a horizontal plane and can be rotated into contact with two diagonally spaced fixed electrical contacts. As soon as the rotating blade assembly engages the fixed contacts further rotation of the rotating blade assembly in the horizontal plane is prohibited and rotation of the rotating blade assembly about its own axis will occur if further force is delivered to the rotating blade assembly. The fixed contacts are provided with means for insuring good electrical contact between the rotating blade assembly and the fixed contacts after the rotating blade assembly has been initially rotated into contact with the fixed switch contacts and further rotated into a secured engagement with the fixed switch contacts through the rotation of the rotating blade assembly upon its own axis. To open the rotating blade double break switch, the rotating blade assembly is first rotated about its own axis so as to disengage from the fixed switch contacts and then rotated in a horizontal plane free from the fixed switch contacts.

Referring now to the drawings for a more detailed description of the embodiment of the invention illustrated in the drawings:

FIGURE 1 illustrates a preferred embodiment of the invention which comprises a rotating blade assembly 10 having oppositely extending blade arms 12 and 14. The rotating blade assembly 10 is mounted in bearing housing 36 which in turn is mounted on insulating column 14. The insulating column 14 is rotatable about its own longitudinal axis and is mounted upon a convenient base, such as the base 16. Also positioned on the base 16 are the fixed switch contact insulators 18 and 20. The fixed switch contact insulators 18 and 20 are rigid and stationary. Mounted to the fixed switch contact insulators 18 and 20 are the fixed contacts themselves 22 and 24, respectively. The fixed contacts 22 and 24 are mounted to face in opposite directions so as to provide for the engagement of the rotating blade assembly 10. As shown in FIGURE 2 the rotating blade assembly 10 rotates into a closed position in a counter-clockwise direction as viewed in FIGURE 2. Each of the fixed contacts 22 and 24 are provided with terminal lugs 26 and 28, respectively, to which appropriate electrical power lines may be attached. An electrical circuit is completed through the terminal lug 26, the fixed contact 22, the rotating blade assembly 10, through the fixed contact 24 and out through the terminal lug 28. The circuit may be broken by rotating the insulating column 14 in a clockwise direction thus disengaging the rotating blade assembly 10 from the fixed contacts 22 and 24.

If the rotating blade assembly 10 was merely rotated into contact with the fixed switch contacts 22 and 24 it is apparent that many difficulties would occur, especially if the electrical switch was utilized outdoors, due to the normal expansion and contraction of the rotating blade assembly 10 and the fixed switch contacts 22 and 24 due to weather and also due to accumulations such as ice formation and so forth. Therefore, the rotating blade electrical switch embodying the features of the invention is provided with means for rotating the rotating blade assembly 10 about its own axis into a tight contact with the fixed switch contacts 22 and 24 after it has initially contacted the fixed switch contacts 22 and 24.

To facilitate a good electrical contact between the rotating blade assembly 10 and the fixed switch contacts 22 and 24, the extending blade arms 14 and 12 of the rotating blade assembly 10 are provided with flattened or somewhat elliptical end contact portions 30 and 32, respectively. Therefore after the rotating blade assembly 10 has been rotated into contact with the fixed switch contacts 22 and 24 and then further rotated about its own axis, the flattened end contact portions 30 and 32 revolve into the plane where the flattened end contact portions 30 and 32 present their greatest vertical dimension and thus securely engage the fixed switch contacts 22 and 24. This rotational action of the rotating blade assembly 10 performs the function of wiping the fixed switch contacts 22 and 24 to remove ice or snow or other undesirable accumulations.

Referring now to FIGURE 3 for a more detailed view of the electrical switch embodying the features of the invention, there is illustrated a bearing housing 36 through which the rotary blade assembly 10 extends. The rotating blade assembly 10 is capable of rotating within the bearing housing 36. Mounted on the insulating column 14 for movement therewith is a drive member 40. The drive member 40 may be secured to the insulating column 14 by means of a plurality of machine bolts or the like.

The drive member 40 and the insulating column 14 are rotatable about the bearing housing 36 as can be seen in FIGURES 3 and 5 and as will be explained. A substantially cylindrical upper portion 42 of the drive member 40 extends concentrically around a depending substantially cylindrical extension 44 of the bearing housing 36. The depending extension 44 of the bearing housing 36 is threaded at its lower end and a bottom internally threaded cap 51 is tightly screwed thereon.

The bottom cap 51, the substantially cylindrical upper portion 42 of the drive member 40, and the substantially cylindrical depending extension 44 of the bearing housing 36 are formed so as to provide the ball bearing raceways 53 and 55 clearly illustrated in FIGURES 3 and 5. Ball bearings 52 are provided in the ball bearing raceways 53 and 55 whereby the bearing housing 36 and the drive member 40 may rotate relative to one another.

Extending from the drive member 40, on the left hand side as viewed in FIGURES 1 and 3, is the drive arm 56. The drive arm 56 is provided with an aperture (not shown) through which a follower arm 58 connected to the rotary blade assembly 10 extends. The follower arm 58 is rigidly secured to the rotating blade assembly 10 as best can be seen in FIGURE 4 and rotational movement of the drive member 40 in a horizontal plane as viewed in the drawings will cause the rotational movement of the rotary blade 10 in a vertical plane as viewed in the drawings. Therefore, because of the relative rotational movement of the rotating blade assembly 10 and the drive member 40 the follower arm 58 will necessarily also ride up and down in the aperture (not shown) in the drive arm 56 as well as being moved in a rotational direction responsive to the rotation of the drive arm 56 of the drive member 40.

The rotating blade assembly 10 is provided with a depending substantially V-shaped cam 60. The substantially V-shaped cam 60 is positioned centrally of the bearing housing 36 as can be best seen in FIGURES 3 and 5. Positioned within the substantially cylindrical depending portion 44 of the bearing housing 36 is a spring mechanism comprising a double shoulder plunger 66 having formed thereon two shoulders 68 and 70, respectively. The plunger shoulders 68 and 70 are substantially disc shaped and adapted to engage the inside walls of the substantially cylindrical depending portion 44 of the bearing housing 36. Positioned around the plunger 66 and between the plunger shoulder 68 and the bottom cap 51 is a compression spring 69 which urges the plunger 66 out of the depending portion 44 of the bearing housing 36. Positioned on a pair of mounting lugs 65 formed on the shoulder 70 is a disc member 72 mounted for pivotable movement with respect to the plunger 66 by a securing shaft 74.

When the rotating blade switch is in a closed position, the pivotable disc 72 mounted on the plunger 66 is positioned adjacent the flat surface 76 formed at the apex of the substantially V-shaped cam 60 as shown in FIGURE 5, and therefore no rotational force is delivered to the rotating blade assembly 10 from the plunger 66. When the electrical rotating blade electrical switch is in the open position wherein the rotating blade assembly 10 is rotated away from the fixed contacts 22 and 24, then the disc member 72 of the plunger 66 is positioned in one of the circular detents 80 and 82 of the substantially V-shaped cam 60. In the embodiment of the invention illustrated in the drawings the disc member 72 is positioned in the circular detent 80 due to the fact that the rotating blade assembly 10 is rotated in a clockwise direction when the rotating blade assembly 10 is rotated into a tight secure contact with the fixed switch contacts 22 and 24.

Bearing housing 36 and the rotating blade assembly 10 are adapted for rotatable movement with one another and are so arranged so as to provide ball bearing raceways 41 and 43 therebetween. Ball bearings 50 are inserted into the ball bearing raceways 41 and 43 so that the rotating blade assembly 10 may rotate relative to the bearing housing 36. The rotating blade assembly 10 can be rotated by the drive member 40 and specifically by the drive arm 56 engaging the follower arm 58 causing the rotating blade assembly 10 to be rotated about its own axis. Rotation of the rotating blade assembly 10 from its rotated position or closed position as viewed in FIGURE 5 back to its open position is accomplished by the combination of the follower arm 58 and the spring mechanism including the spring 69 as will be seen later.

Figure 7:
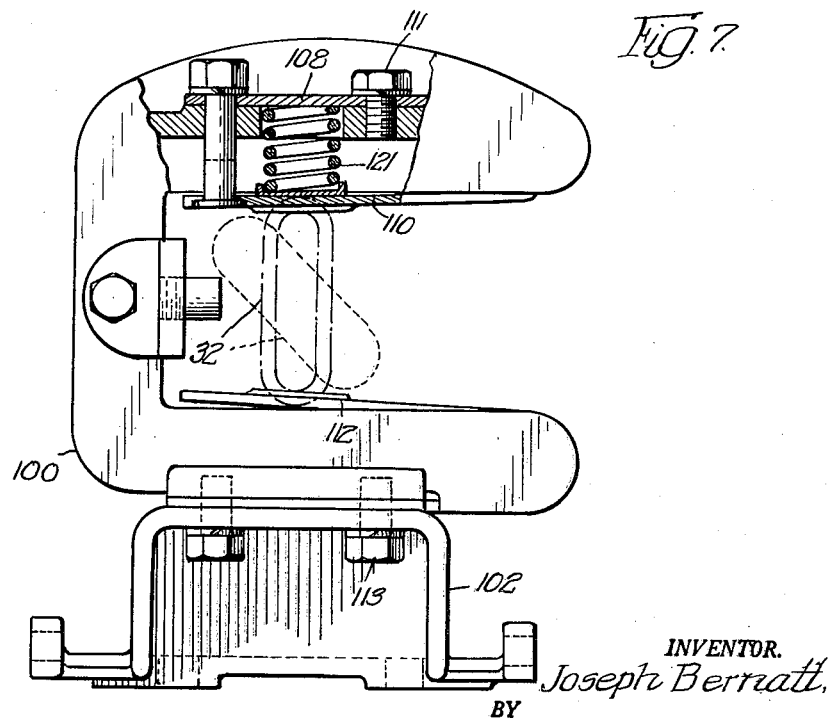
FIGURE 7 is a fragmentary partially cut-away side elevational view illustrating in more detail the fixed switch contact and rotating blade of the embodiment of the invention illustrated in FIGURE 1.

Referring now to FIGURES 6 and 7 for a more detailed description of the fixed switch contacts 22 and 24. It can be seen that the fixed switch contacts 22 and 24 are comprised of a main body portion 100 and a terminal lug portion 102. The terminal lug portion 102 may be provided with appropriate apertures which may be threaded to readily attach electrical power cables to the fixed switch contacts. The fixed switch contacts are provided with a plurality of resilient upper contact fingers 108 and a plurality of resilient lower contact fingers 109 positioned side by side and attached to the main body portion 100 by a plurality of bolts 111 and 113, respectively. Extending from each of the plurality of upper contact fingers 108 and lower contact fingers 109 are the cantilevered leaf spring contact sections 110 and 112, respectively. Both contact section 110 and contact section 112 may be integrally formed on the contact fingers 108 and 109 and may be comprised of resilient spring material. A biasing spring 121 may be provided adjacent each finger contact 108 and 109 if desired.

Operation

Assume now that the rotating blade electrical switch is in an open condition, that is, the electrical circuit through the switch is open and no current is flowing through the rotating blade electrical switch. Also assume that the rotating blade electrical switch is fully open. When the rotating blade electrical switch is fully open the disc member 72 will ride in the detent 80 of the substantially V-shaped cam 60 and the longitudinal axis of the rotating blade assembly 10 will be perpendicular to a line interconnecting the fixed switch contacts 22 and 24. In order to close the rotating blade electrical switch at this time the operator rotates the pivotable insulating column 14 by any convenient means such as a hand lever (not shown) attached to the pivotable insulating column 14. The drive member 40, the bearing housing 36 and the rotating blade assembly 10 will initially all move in unison with the rotation of the pivotable insulating column 14 and there will be no relative movement with respect to one another. This is due to the fact that the frictional engagement between the depending substantially cylindrical portion 44 of the bearing housing 36 and the upper extended substantially cylindrical portion 42 of the drive member 40, the frictional engagement of the follower arm 58 with the drive arm 42 of the drive member 40, the biasing force exerted by the spring 69 through the plunger 66 and the substantially V-shaped cam 60 to the rotating blade assembly 10 to increase the frictional force between the rotating blade assembly 10 and the bearing housing 36, and the force transmitted to the rotating blade assembly 10 from the walls of the bearing housing 36 all combine when the rotating blade electrical switch is in an open position to cause the bearing housing 36 and the rotary blade assembly 10 and drive member 40 to rotate in unison and without and relative movement.

The rotating blade electrical switch continues rotation until the end contact portions 30 and 32 of the rotating blade assembly 10 engage the fixed switch contacts 22 and 24. As soon as the end contact portions 30 and 32 engage the fixed switch contacts 22 and 24, respectively, further rotation of the rotating blade assembly 10 in the horizontal plane is prevented. If at this time the insulating column 14 and the attached drive member 40 are further rotated, then the frictional force between the lower extended portion 44 of the bearing housing 36 and upper portion 42 of the drive member 40 will be overcome and the drive member 40 will rotate with respect to the bearing housing 36. As soon as the drive member 40 begins to rotate with respect to the bearing housing 36, the drive arm 56 of the drive member 40 moves the follower arm 58. The follower arm 58 then causes the rotating blade assembly 10 to rotate in a clockwise direction in a vertical plane as viewed in the drawings and the follower arm 58 also moves downwardly further into the aperture (not shown) provided therefor in the drive arm 56. Rotation of the rotating blade assembly 10 will continue with the continued rotation of the drive element 40 until the end contact portions 30 and 32 engage the spring loaded cantilevered elements 110 and 112 and thereby cause wiping of the surfaces of the fixed switch contacts 22 and 24.

As soon as the rotating blade assembly 10 begins to rotate with respect to the bearing housing 36, the circular disc 72 of the plunger 66 moves out of the detent 80 in the substantially V-shaped cam 60 and begins to travel down the adjacent surface of the V-shaped cam 60 towards the end flat surface 76. During the entire length of travel the spring 69 through the plunger 66 and disc 72 exerts a biasing rotational force on the substantially V-shaped cam 60 to tend to cause the rotating blade assembly 10 to be rotated back to its original position. Therefore force exerted on the drive member 40 must also overcome the force exerted on the rotating blade assembly 10 by the biasing spring 69. Finally after the rotating blade assembly has been rotated into the closed position and a good electrical contact made, then the pivotable disc 72 will be riding flush against the flat surface 76 of the substantially V-shaped cam 60. In this position the spring 69 will not exert any rotational force upon the rotating blade assembly 10 through the plunger and rotatable discs 66 and 72, respectively.

If it is desired to open the rotating blade electrical switch, the insulating column 14 is pivoted in an opposite direction to the direction of closing. The rotating blade electrical switch is arranged such that the frictional force between the end contact portions 30 and 32 of the rotating blade assembly 10 and the fixed switch contacts 22 and 24 will be stronger than the frictional force between the lower extended portion 44 of the bearing housing 36 and the upper portion 42 of the drive member 40 and the drive member 40 will rotate with respect to the bearing housing 36 and the drive arm 56 of the drive member 40 will engage the follower arm 58 and rotate the follower arm 58 in a counter-clockwise direction to disengage the end contact members 30 and 32 from the fixed switch contacts 22 and 24. At the same time that the rotating blade assembly 10 is moving, the V-shaped cam 60 positioned on the rotating blade assembly 10 is also moving with respect to the circular disc 72 of the plunger 66 and in response thereto the disc 72 will ride on the cam surface between the detent 80 and the flat surface 76 of the V-shaped cam 60 and will exert a rotational force upon the rotating blade assembly 10 from the spring 69 through the pivotable disc 72 and through the V-shaped cam 60 to the rotating blade assembly 10. The spring 69 will then cause the end portions 30 and 32 of the rotating blade assembly to rotate into a horizontal plane as viewed in the drawings wherein the pivotable disc 72 will ride in the detent 80 and thereby exert no rotational force on the rotating blade assembly 10. The rotating blade electrical switch can then be rotated to its fully open position.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. An electrical switch comprising a drive means, bearing means mounted on said drive means, said drive means arranged for relative movement with respect to said bearing means, a switch blade assembly rotatable with respect to said bearing means about its longitudinal axis and arranged for bodily swinging movement with said bearing means, means interlinking said blade assembly and said drive means for causing rotation of said blade assembly between a first position and a second position with respect to said bearing means when said bearing means and said drive means are moved relative to one another, biasing means between said blade assembly and said bearing means effective in all rotational positions exclusive of said second rotational position for urging said blade assembly into said first rotational position, said biasing means including a pressure member carried by said bearing means and a cooperating cam surface carried by said blade assembly, and stop means for arresting swinging movement of said blade assembly and bearing means, whereby said bearing means and said drive means are movable relative to one another and said blade assembly is rotatable between said first position and said second position.

2. An electrical switch comprising: a drive means, bearing means mounted on said drive means, said drive means arranged for relative movement with respect to said bearing means, a switch blade assembly rotatable with respect to said bearing means about its longitudinal axis and arranged for bodily swinging movement with said bearing means, means interlinking said blade assembly and said drive means for causing rotation of said blade assembly between a first position and a second position with respect to said bearing means when said bearing means and said drive means are moved relative to one another, biasing means between said blade assembly and said bearing means effective in all rotational positions exclusive of said second rotational position for urging said blade assembly into said first rotational position, said biasing means including a pressure member carried by said bearing means and a cooperating cam surface carried by said blade assembly, said pressure member and said cooperating cam surface being arranged such that in the first rotational position of said blade assembly a biasing force operates to resist rotational displacement and in said second rotational position no rotational force operates on said blade assembly, and stop means for arresting swinging movement of said blade assembly and bearing means, whereby said bearing means and said drive means are movable relative to one another and said blade assembly is rotatable between said first position and said second position.

3. An electrical switch comprising: a drive means, bearing means mounted on said drive means, said drive means arranged for relative movement with respect to said bearing means, a switch blade assembly rotatable with respect to said bearing means about its longitudinal axis and arranged for bodily swinging movement with said bearing means, means interlinking said blade assembly and said drive means for causing rotation of said blade assembly between a first position and a second position with respect to said bearing means when said bearing means and said drive means are moved relative to one another, baising means between said blade assembly and said bearing means effective in all rotational positions exclusive of said second rotational position for urging said blade assembly into said first rotational position, said biasing means including a spring loaded pressure member carried by said bearing means and a detented cam lever carried by said blade assembly, said spring loaded pressure member being capable of translational movement relative to said bearing means and said cam lever being capable of rotational movement with said blade assembly, said spring load pressure member and said detented cam lever cooperating so that in the first rotational position of said switch blade assembly said pressure member is unloaded and seated in said detent and so that in said second rotational position said pressure member is loaded against said blade assembly applying a non-rotational force thereto and so that in positions between said first and second positions said pressure member is loaded against said cam surface to rotate said blade assembly into said first position, and stop means for restricting swinging movement of said blade assembly and bearing means and for frictionally engaging said blade assembly in said second rotational position, whereby upon engagement between said stop means and said blade assembly further movement of said drive means causes relative movement of said drive means and bearing means and resultant rotational movement of said blade assembly between said first position and said second position.

References Cited in the file of this patent
UNITED STATES PATENTS
2,810,799   Carmichael et al. -------- Oct. 22, 1957